Oct. 21, 1958  J. A. BENNETT ET AL  2,856,769
TORSION TESTING MACHINE FOR WIRE
Filed April 1, 1957   3 Sheets-Sheet 1
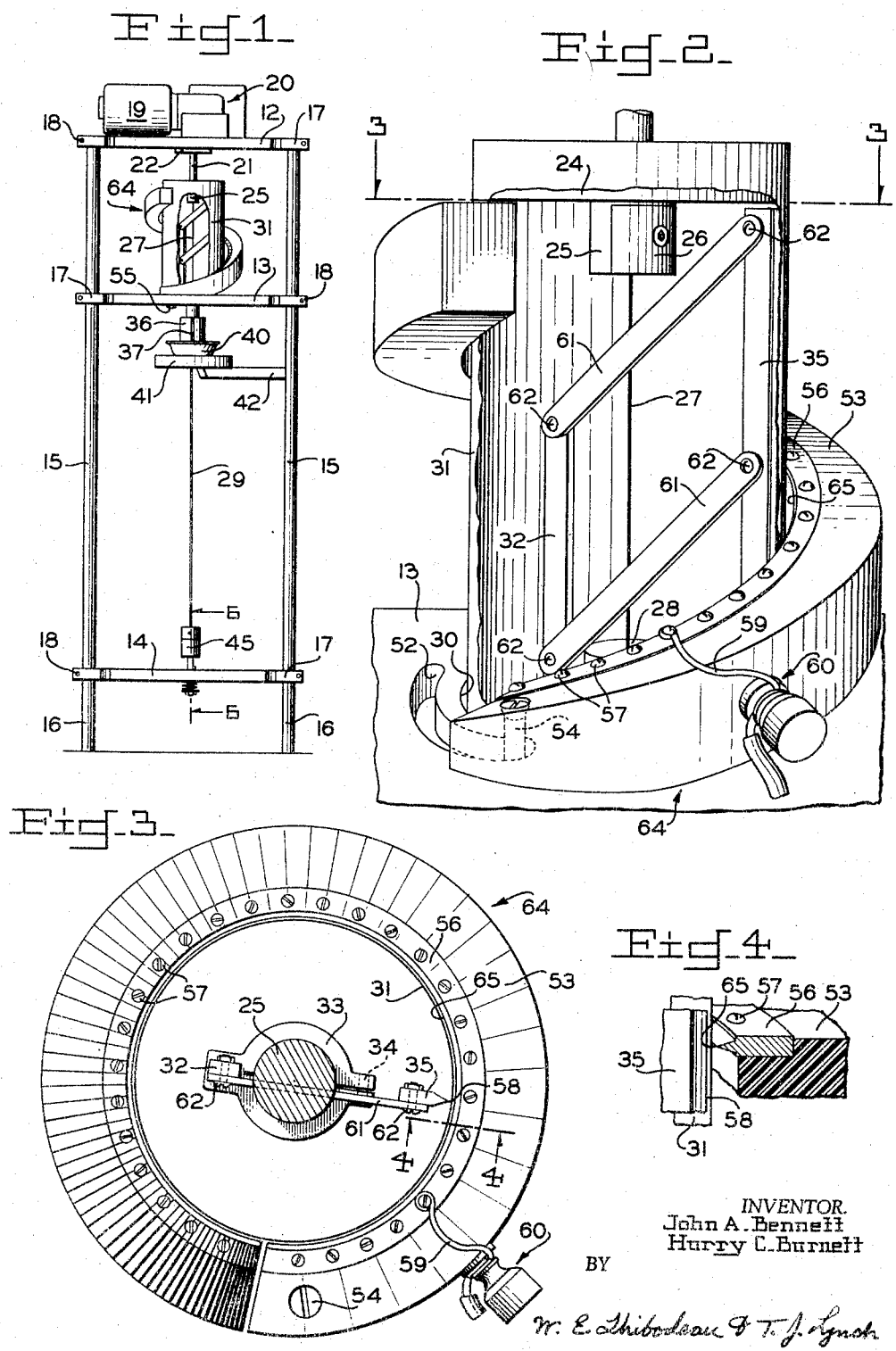
INVENTOR.
John A. Bennett
Harry C. Burnett

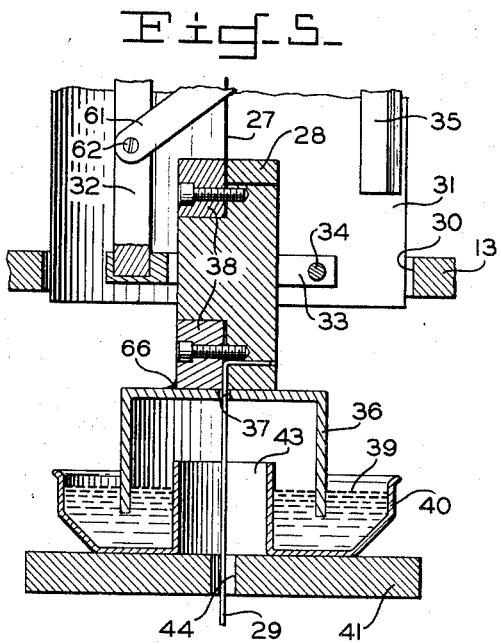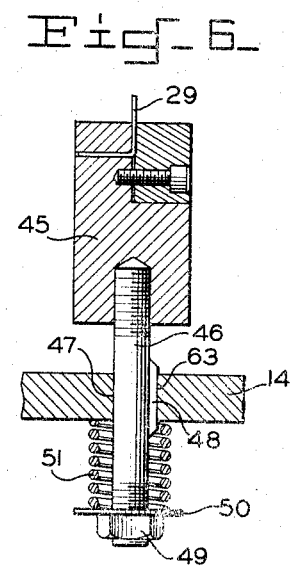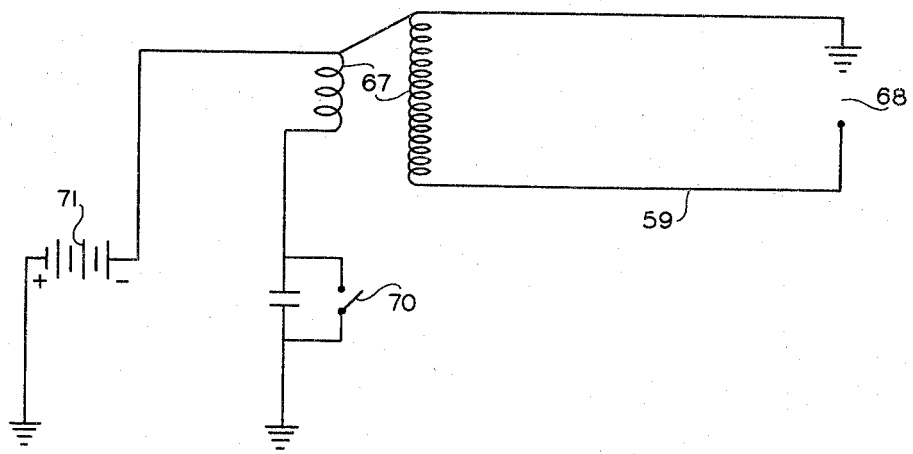

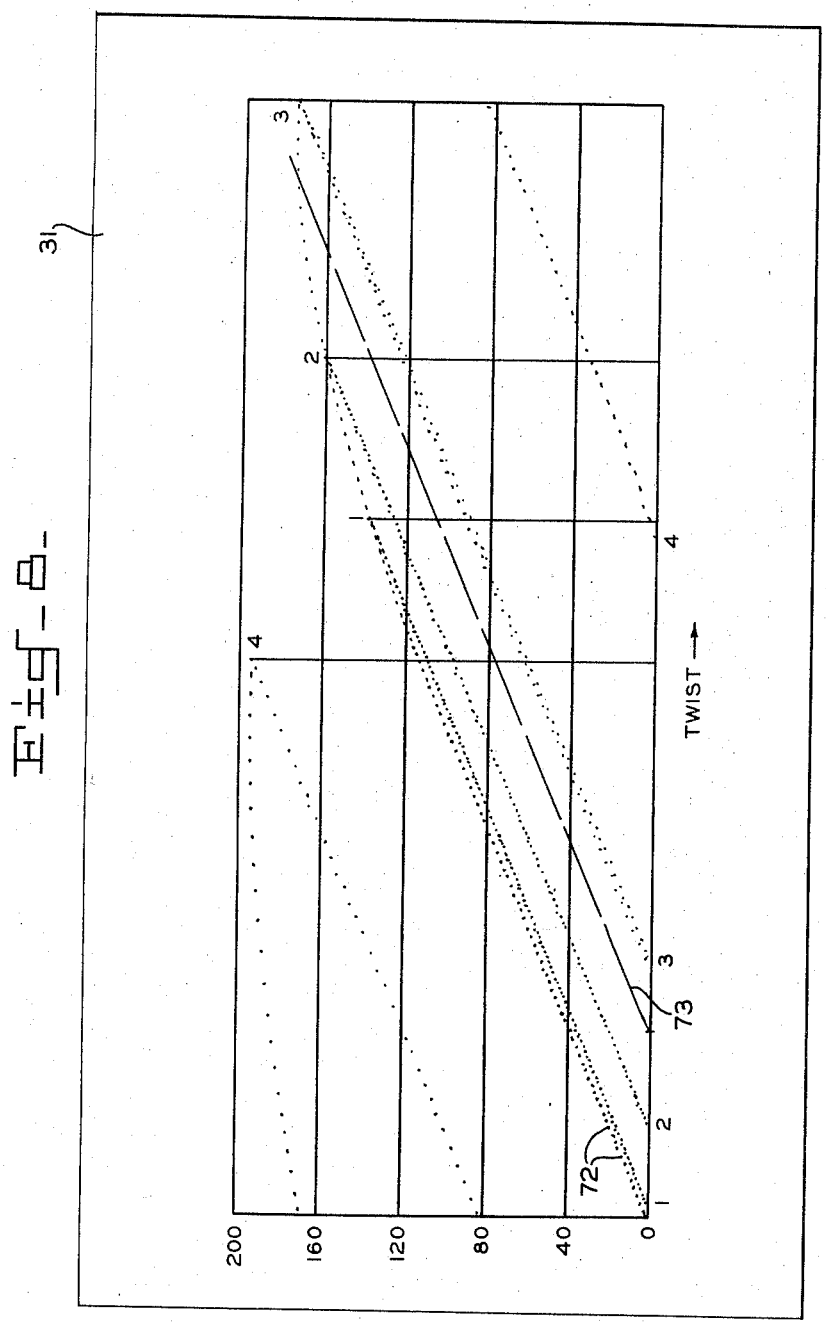

United States Patent Office 2,856,769
Patented Oct. 21, 1958

2,856,769

TORSION TESTING MACHINE FOR WIRE

John A. Bennett and Harry C. Burnett, Bethesda, Md., assignors to the United States of America as represented by the Secretary of the Army Application April 1, 1957, Serial No. 650,055

6 Claims. (Cl. 73—99)

(Granted under Title 35, U. S. Code (1952), sec. 266)

The invention described herein may be manufactured and used by or for the Government for governmental purposes without the payment of any royalty thereon.

This invention relates to the testing of wire intended for the fabrication of springs and is more particularly directed to means for determining the stress-strain characteristics of spring wire under torsional load.

Present methods of determining the ability of spring wire to resist torsional load generally rely upon procedures which involve stressing the wire to the point of actual rupture. While such testing is highly useful in determining the quality of the wire, it does not reveal any significant information about the behavior which can be expected during the working thereof when in the form of a helical extension or compression spring. Such data is normally obtained by loading the spring wire in torsion, determining the degree of strain in the wire at selected intervals during the loading, and then plotting the loads as a function of the resulting strains to form a continuous stress-strain diagram. However, such procedure is extremely laborious and, furthermore, is subject to human error inasmuch as there is no way to verify the accuracy of the strain readings. In addition, the accuracy of the resulting curve is adversely affected by the necessity for interrupting the continuity of loading while each strain reading is being taken.

Accordingly, it is an object of this invention to provide a means for automatically determining the yield point and permanent set characteristics of spring wire in torsion.

It is a further object of the invention to provide means for automatically recording the simultaneous values of torque and twist in a spring wire subjected to torsional loading at a constant rate.

Another object of the present invention is to provide a machine for automatically recording the stress-strain relationship of spring wire in torsion wherein wire of various diameters can be readily tested within a relatively wide range of applied load.

A further object of this invention is to provide a machine for providing an accurate determination of the stress-strain relationship of spring wire under torsional load wherein the method of recording is particularly adapted for the testing of relatively small diameter wire requiring the application of but very little torque.

It is a specific object of this invention to provide an improved machine for automatically recording the stress-strain values of spring wire under torsional load which is characterized by a relatively inexpensive construction, simplicity of operation, and a maximum of accuracy in the recorded results.

The specific nature of the invention as well as other objects and advantages thereof will clearly appear from a description of a preferred embodiment as shown in the accompanying drawings in which:

Fig. 1 is a front view of the complete testing machine with a portion of the recording paper cut away to show the wire specimen under test;

Fig. 2 is an enlarged perspective view of the upper portion of the machine with the recording paper diametrically cut away to show the relationship between the fixed and movable electrodes;

Fig. 3 is a cross-sectional view taken along line 3—3 of Fig. 2;

Fig. 4 is a fragmentary sectional view taken along line 4—4 of Fig. 3 to show the cross-sectional configuration of the fixed electrode;

Fig. 5 is a fragmentary view of the machine taken along the axis of the test wire to show the details of the means for coupling the test and standard wires;

Fig. 6 is a view taken along line 6—6 of Fig. 1 in enlarged section to show the means for providing a constant tension in the calibrated standard wire;

Fig. 7 is a schematic view of the interrupter circuit; and

Fig. 8 is a developed view of the recording paper showing a typical stress-strain diagram thereon.

As shown in Fig. 1 of the drawings, the frame of the wire testing machine of the present invention is formed by a trio of spaced-apart horizontal plates 12, 13, and 14, each being in axial alignment with one another and preferably of rectangular configuration. These plates are joined by vertical rods or tubes 15 which extend downwardly from each corner of the uppermost plate 12 through the respective corners of the middle and lower plates 13 and 14 to terminate in leg portions 16. Each corner of the rectangular plates is provided with a split section 17 which can be tightened by suitable screws 18 into clamping engagement with rods 15. Such construction provides a light but rigid frame wherein the vertical disposition of each of the rectangular plates can be varied as desired.

Fixedly mounted on plate 12 is a conventional motor 19 to which is coupled a reduction gear unit 20 having a drive shaft 21 extending downwardly therefrom through a bearing 22 fixedly mounted in the center of plate 12. The gears in unit 20 are arranged so as to rotate shaft 21 in either direction or to prevent rotation thereof by the manipulation of a suitable selector member (not shown). If desired, shaft 21 may be manually rotated by a crank instead of by motor 19.

The lower end of shaft 21 is provided with a circular flange 24 and continues therethrough to terminate in a cylindrical chuck 25 having a clamping portion 26 thereon for securely holding one end of a test length of the spring wire 27 whose stress-strain characteristics are to be determined. The other end of wire 27 is similarly held in place by a clamping portion 38 in the upper end of an elongated coupling member 28 which extends through a suitable opening 30 in plate 13. Each end of wire 27 is preferably turned at right angles as best shown in Fig. 5 to prevent any loosening thereof during the application of torsional load. The lower end of coupling member 28 is provided with another clamping portion 38 arranged to securely hold the upper end of a second wire 29 of larger diameter than test wire 27 and of known torque resistance. The diameter of wire 29 is arranged to be large enough so that the elastic limit thereof will not be exceeded by the maximum torque anticipated. A heat-sensitive recording paper 31 is formed as a hollow cylinder and is suitably secured at the upper end thereof to flange 24 to extend downwardly through opening 30 and to terminate slightly below middle plate 13.

A vertical bar 32 of substantially rectangular construction is provided with a circular clamp 33 at the lower end thereof of sufficient diameter to completely surround coupling member 28. Clamp 33 is preferably of split construction and the free ends thereof are secured together by a suitable screw 34 into releasable engagement with coupling member 28. A second vertical bar 35 of substantially rectangular cross-section is fixedly connected to bar 32 by a pair of spaced-apart parallel straps 61 which are upwardly inclined to form a parallelogram construction entirely within the interior of recording paper 31 as best shown in Fig. 2. The diameter of clamp 33 is so proportioned that bars 32 and 35 will be substantially equidistant from the center of coupling member 28 and thereby equalize the weight of the entire electrode construction about the axis of test wire 27 in order to prevent any misalignment thereof. Straps 61 may be pinned to bars 32 and 35 but are preferably bolted thereto as shown at 62 in order to permit adjustment of the horizontal distance between vertical bars 32 and 35 for a purpose to be hereinafter shown.

A cup-shaped member 36 is invertedly secured to the underside of coupling member 28 by being brazed or welded thereto as indicated at 66 and extends downwardly into a quantity of damping fluid 39, such as light oil, which is contained in a dish or pan 40 mounted on a circular plate 41 formed at the end of a bracket 42 suitably clamped to one of rods 15 below middle plate 13. Pan 40 is formed with an upwardly extending hollow cylindrical portion 43 in the center thereof of lesser diameter than cup-shaped member 36.

The torque measuring wire 29 is of predetermined thickness and strength and extends downwardly from coupling member 28 through member 36 into hollow portion 43 of pan 40 and through a central hole 44 in circular plate 41. The lower end of wire 29 is clamped in a cylindrical chuck 45 similar to chuck 25. A threaded stud 46 is screwed into the underside of chuck 45 and extends downwardly therefrom through a central hole 47 in lower plate 14. A vertical key 48 is provided in stud 46 to slidably engage in a suitable key slot 63 formed in hole 47 and prevent rotation of the torque-measuring wire 29 without affecting the required vertical movement thereof. A nut 49 threaded onto the lower end of stud 46 is arranged to support a washer 50 thereon. A coil spring 51 is placed about stud 46 between washer 50 and the underside of plate 14 to provide sufficient tension to wires 27 and 29 to keep them taut.

As shown in Fig. 2, a helical electrode 64 is adjustably secured to middle plate 13 so as to extend about the cylinder of recording paper 31. Electrode 64 comprises a current-carrying strip 56 fixedly mounted by a plurality of regularly spaced screws 57 along the entire inner peripheral edge of a support portion 53 fabricated of an electrically resistant plastic material. The lower end of support portion 53 is provided with a depending bolt 54 which projects through an arcuate slot 52 in plate 13 disposed exteriorly of central opening 30 and substantially concentric therewith. The projecting end of bolt 54 is adapted to receive a locking nut 55 so that electrode 64 can be clamped in the particular position which will start the stress-strain curve at the zero point on the interior surface of recording paper 31. The outer edge of vertical bar 35 is provided with a knife edge as shown at 58 and a similar knife edge 65 is formed along the inner edge of strip 56 directly opposite knife-edge surface 58 to form a spark gap 68 therebetween.

An electrical current is supplied to strip 56 by a lead 59 connected to one of screws 57 and extending in wrapped relation about a terminal 60 fixedly mounted in any suitable manner to the exterior periphery of electrode support 53. The other end of lead 59 is connected to an automotive ignition coil 67 which is in turn connected to vertical bar electrode 35. A separately driven cam (not shown) is arranged to open and close a microswitch 70 in series with coil 67. Thus, as current is passed to coil 67 from a suitable electrical source 71, the resulting spark formed across gap 68 burns a path transversely through recording paper 31 to form a recording dot 72. The circuit is preferably arranged to open and close at five-second intervals since it has been found that such timing will provide sufficient space between dots 72 on recording paper 31 to eliminate the tendency for the spark to pass through the hole made by the previous discharge instead of taking a direct path between the knife edges of electrodes 35 and 53.

The machine is adapted to be rapidly set up for running a test inasmuch as no special preparation of test wire 27 is necessary other than the cutting thereof to the required length and the bending of the ends at right angles. One end of test wire 27 is clamped in chuck 25 and the other end in coupling member 28 to which electrode 35 is fastened by clamp 33. A cylinder of recording paper 31 is then placed in position about test wire 27 and fastened at the upper end thereof to circular flange 24 to extend downwardly through opening 30 in middle plate 13. The upper end of standard wire 29 is then inserted into the lower end of coupling member 28 and held therein by the clamping portion to which cup-shaped member 36 is attached. Member 36 is provided with a vertical slot 37 for the passage of wire 39 into the interior thereof as clamping portion 38 is being secured to coupling member 28. The lower end of standard wire 29 is thereafter fastened in chuck 45 which is then keyed against rotation by the engagement of key 48 in hole 47. Finally, oil pan 40 is placed in position so that the bottom of cup-shaped member 36 is immersed in oil 39.

Helical electrode 64 is then adjusted by means of bolt 54 and nut 55 to align the beginning thereof with the zero load position indicated on recording paper 31. Vertical electrode 35 is also adjusted to align with the lower end of electrode 64. The drive motor 19 and the spark interrupter mechanism are then turned on and the test is in progress. If necessary, the size of gap 68 may be adjusted by loosening bolts 62 to permit a change in the inclination of straps 61. As torque is applied to the system by motor 19, the difference in rotation between recording paper 31 and bar electrode 35 is a measure of the strain in test wire 27. Rotation of bar electrode 35 is a measure of the torque in the system and is recorded by the vertical displacement of gap 68 formed between the opposite knife-edged surfaces of electrodes 35 and 64. As the position of gap 68 changes with the rotation of electrode 35, the dots 72 formed in recording paper 31 by the sparks which pass therethrough produce a continuous line representing the torque-twist data of test wire 27.

The chart shown in Fig. 8 is a typical example of a record obtained from a test to determine the permanent set characteristics produced by loading a sample of 0.039 inch diameter 1085 oil tempered wire in torsion. For convenience, the torque values have been scaled along the ordinate in terms of nominal shear stress and the twist is arranged to increase to the right along the abscissa. The numbers at the top of the chart indicate the points of peak stress in each cycle of torsional load while the numerals at the bottom show the points at which each cycle begins. It is apparent from tracing the path of dots 72 that each cycle begins at the end of the preceding cycle. The distances along the abscissa between successive numerals show the total amount of permanent set of the respective cycles of torsional load. The yield strength of the test wire may also be determined by extending a line 73, as shown in Fig. 8, parallel to the normal slope of the stress-strain curve and offset therefrom by a distance calculated to provide an equivalent for the 0.2% off-set conventionally used to determine the yield point in linear plastic strain.

Thus, there is here provided a relatively simple apparatus for providing an automatic record of the stress-strain curve of a test sample of spring wire being stressed in torsion. Such apparatus lends itself to the stress-strain testing of even the thinnest of spring wires inasmuch as the reduction in area or elongation thereof need not be measured directly. Moreover, the stress-strain data can be determined in a remarkably short time in comparison to the former methods which required the separate taking of a plurality of actual strain measurements. In addition, the spark method of recording eliminates errors due to friction, so that even the smallest torques can be recorded accurately. Furthermore, the machine can be readily adjusted to test wire of different diameters and lengths. Thus, the foregoing apparatus provides a rapid yet accurate means for determining the probable behavior of spring wire when coiled into spring form without the necessity for first fabricating the springs and testing them under actual operating conditions.

Although a particular embodiment of the invention has been described in detail herein, it is evident that many variations may be devised within the spirit and scope thereof and the following claims are intended to include such variations.

We claim:

1. In apparatus for determining the stress-strain characteristics of a test length of spring wire under torsional load, a torque measuring wire of greater diameter and elastic limit than the test wire, means for coupling said torque measuring wire to the test wire, first chuck means for clamping the upper end of the test wire, second chuck means for clamping the lower end of said torque measuring wire against rotation, means for rotating said first chuck means to impart twisting movement to the test wire and thereby to said torque measuring wire, a vertical electrode mounted to said coupling means for rotation therewith, a fixed electrode helically disposed about said rotatable electrode to form a continuous spark gap therebetween, a recording paper secured to said first chuck means to extend downwardly through said spark gap between said vertical and helical electrodes, said paper having a sensitized surface adapted to change color in response to the passage of electrical current therethrough, and means for producing a continuous series of sparks during the rotation of said vertical electrode to trace a visible path of the relative change in position of said spark gap and thereby indicate the strain in the test wire as a function of the torque applied to said torque measuring wire.

2. In apparatus for determining the stress-strain characteristics of a test length of spring wire under torsional load, a torque measuring wire of greater diameter and elastic limit than the test wire, means for coupling said torque measuring wire to the test wire in series, means for twisting the test wire at a constant known rate, key means for securing the lower end of said torque measuring wire against rotation whereby the twisting of the test wire rotates said coupling means to impart corresponding twisting movement to said torque measuring wire, a vertical bar electrode adjustably secured to said coupling means for rotation therewith, a fixed electrode helically disposed about said rotatable electrode to form a continuous spark gap therebetween, a hollow cylinder of heat-sensitive recording paper disposed along said spark gap and rotatively responsive to the twisting of the test wire, means for adjusting said helical electrode and said vertical bar electrode to zero-torque position on said recording paper, and means for producing a continuous series of sparks during the rotation of said vertical electrode to trace a visible path defining the change in position of said spark gap along said helical electrode and thereby indicate the strain in the test wire as a function of the torque applied to said torque measuring wire.

3. In apparatus for determining the stress-strain characteristics of a test length of spring wire under torsional load, a frame having a motor mounted thereon, a drive shaft extending downwardly from said motor to terminate in a first chuck having means for clamping the upper end of the test wire, a torque measuring wire of greater diameter and elastic limit than the test wire, an elongated coupling for connecting the lower end of the test wire to the upper end of said torque measuring wire, a second chuck having means for clamping the lower end of said torque measuring wire, key means on said second chuck slidably engageable in said frame for preventing rotation of the free end of said torque measuring wire, resilient means for imparting tension to said torque measuring wire and thereby to the test wire, whereby the torque imparted to the test wire is transmitted to said torque measuring wire through said elongated coupling therebetween, a vertical electrode having a knife-shaped edge, means for adjustably clamping said vertical electrode to said elongated coupling for rotation therewith, a fixed electrode having a knife-edged strip helically disposed about said vertical electrode in opposing alignment with said knife-shaped edge thereon to form a continuous spark gap therebetween, a cylinder of heat-sensitive recording paper extending downwardly from said first chuck along said spark gap, electrical means for producing a spark between said vertical and helical electrodes to form a corresponding visible dot on said recording paper, and means for continuously interrupting the spark formation to trace a visible path of the change in position of said spark gap and thereby indicate the strain in the test wire as a function of the torque applied to said torque measuring wire.

4. The combination defined in claim 3 including means for damping the oscillations imparted to the test wire during the twisting movement thereof, said damping means comprising a bracket fixedly secured to said frame below said elongated coupling, a pan secured to the end of said bracket and having a hollow cylindrical portion projecting upwardly from the center thereof around said torque measuring wire, a damping fluid contained in said pan about said hollow portion thereof, and an inverted cup-shaped member secured to the underside of said coupling member to extend downwardly over said hollow portion of said pan and into said damping fluid contained therein.

5. The combination defined in claim 3 wherein said vertical electrode comprises a support bar of rectangular cross-section having a circular clamping portion at the lower end thereof, means for adjustably securing said clamping portion around said elongated coupling, a pair of inclined parallel strap members extending upwardly and outwardly from said bar at spaced-apart locations thereon to hold said knife-edged electrode portion parallel to said support bar, and means for adjustably locking said electrode portion toward or away from said support bar to control the length of said spark gap.

6. The combination defined in claim 3 wherein said means for producing an interrupted spark comprises a source of current, an ignition coil connected to said vertical electrode and to said helical electrode, and a microswitch for continuously interrupting the passage of current to said coil.

References Cited in the file of this patent

UNITED STATES PATENTS

| 2,316,253 | Keinath | Apr. 13, 1943 |
| 2,356,763 | Keinath | Aug. 29, 1944 |

FOREIGN PATENTS

| 649,213 | Germany | Aug. 18, 1937 |